US012744265B2

(12) United States Patent
Mori

(10) Patent No.: US 12,744,265 B2
(45) Date of Patent: Sep. 22, 2026

(54) BATTERY PACK

(71) Applicant: TOYOTA JIDOSHA KABUSHIKI KAISHA, Toyota (JP)

(72) Inventor: Shinichiro Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1024 days.

(21) Appl. No.: 17/945,361

(22) Filed: Sep. 15, 2022

(65) Prior Publication Data

US 2023/0100031 A1 Mar. 30, 2023

(30) Foreign Application Priority Data

Sep. 24, 2021 (JP) ................................ 2021-155147

(51) Int. Cl.
*H01M 10/659* (2014.01)
*H01M 10/613* (2014.01)
*H01M 10/625* (2014.01)
*H01M 50/242* (2021.01)

(52) U.S. Cl.
CPC ....... *H01M 10/659* (2015.04); *H01M 10/613* (2015.04); *H01M 10/625* (2015.04); *H01M 50/242* (2021.01); *H01M 2220/20* (2013.01)

(58) Field of Classification Search
CPC . H01M 50/242; H01M 10/625; H01M 10/613
See application file for complete search history.

(56) References Cited

U.S. PATENT DOCUMENTS

2010/0206517 A1 8/2010 Asakura
2018/0287227 A1* 10/2018 Jeong ...................... B60L 58/25
2020/0168965 A1 5/2020 Tanaka et al.

FOREIGN PATENT DOCUMENTS

CN 101779095 A 7/2010
CN 214254595 U 9/2021
JP 2020-082983 A 6/2020
WO WO-2022143064 A1 * 7/2022 .......... H01M 10/613

OTHER PUBLICATIONS

WO2022143064A1 translation (Year: 2022).*

* cited by examiner

*Primary Examiner* — Allison Bourke
*Assistant Examiner* — Travis L. Martin
(74) *Attorney, Agent, or Firm* — Dinsmore & Shohl LLP

(57) ABSTRACT

A battery pack includes: a plurality of battery stacks provided such that the battery stacks are placed at intervals in an arrangement direction; a battery outer case in which the battery stacks are stacked; a cooler placed on a bottom face of the battery outer case; and a buffer member. The cooler includes: a plurality of cooling modules provided such that the cooling modules are placed at intervals in the arrangement direction; and a connecting portion configured to connect adjacent cooling modules in the arrangement direction to each other. In each of the cooling modules, a refrigerant passage through which refrigerant flows is formed. The buffer member is placed between the connecting portion and a protection plate placed below the cooler at an interval. A vulnerable portion is formed in a part of the connecting portion, the part being a part where the buffer member is placed.

2 Claims, 5 Drawing Sheets

H
12
52
IV
IV
47
13
47
13
47
13
47
13
50
53
50
L
44
45
45
44
45
45
54
44
45
45
44
45
45
46
51
48
49
C
W

BATTERY PACK

CROSS-REFERENCE TO RELATED APPLICATION

This application claims priority to Japanese Patent Application No. 2021-155147 filed on Sep. 24, 2021, incorporated herein by reference in its entirety.

BACKGROUND

1. Technical Field

This disclosure relates to a battery pack.

2. Description of Related Art

As a battery pack including a battery device and a cooler configured to cool the battery device, various types of battery packs have been proposed.

For example, a battery pack described in Japanese Unexamined Patent Application Publication No. 2020-82983 (JP 2020-82983 A) is placed on the lower face of a floor panel of a vehicle, and the battery pack includes a battery outer case and a cooler placed on the lower face of the battery outer case.

SUMMARY

In the battery device described above, a plurality of battery stacks may be placed at intervals inside the battery outer case.

In view of this, the inventors of the present disclosure examined a case where a cooler was configured such that a cooling module was placed for each battery stack, and a connecting portion configured to connect the cooling modules to each other was provided.

Meanwhile, in a case where a battery pack is placed on the lower face side of a floor panel, foreign matter flicked off by a running vehicle might apply an impact force to the battery pack. In view of this, the inventors of the present disclosure examined a battery pack configured such that a protection plate was placed downward from the bottom face of a battery outer case, and a buffer member was placed between the protection plate and a connecting portion.

The inventors found the following fact. That is, in the battery pack as described above, when an impact force is applied to the protection plate, the impact force is applied to the connecting portion through the protection plate and the buffer member. As a result, the impact force applied to the connecting portion is transmitted to the cooling module, so that the cooling module may be damaged.

This disclosure is accomplished in view of the above problems, and an object of this disclosure is to provide a battery pack including a buffer member placed between a protection plate and a connecting portion, and the battery pack restrains a cooling module from being damaged when an impact force is applied to the protection plate.

A battery pack according to this disclosure includes a plurality of battery stacks, a battery outer case, a cooler, and a buffer member. The battery stacks are placed at intervals in an arrangement direction. In the battery outer case, the battery stacks are accommodated. The cooler is placed on the bottom face of the battery outer case. The cooler includes a plurality of cooling modules provided such that the cooling modules are placed at intervals in the arrangement direction. The connecting portion is configured to connect adjacent cooling modules in the arrangement direction to each other. In each of the cooling modules, a refrigerant passage through which refrigerant flows is formed. The buffer member is placed between the connecting portion and a protection plate placed below the cooler. A vulnerable portion is formed in a part of the connecting portion, the part being a part where the buffer member is placed.

The vulnerable portion may be a mark-off line. The vulnerable portion may be placed on a side closer to a contact portion between the connecting portion and the buffer member than a joined portion between the cooling module and the connecting portion.

With this disclosure, in a battery pack including a cooler including a cooling module and a connecting portion, a protection plate placed below the cooler, and a buffer member placed between the protection plate and the connecting portion, it is possible to restrain the cooling module from being damaged when an impact force is applied to the protection plate.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

With reference to FIGS. 1 to 7, the following describes a battery pack according to the present embodiment. Among constituents illustrated in FIGS. 1 to 7, identical or substantially identical constituents have the same reference sign, and redundant descriptions are omitted.

Figure 1:
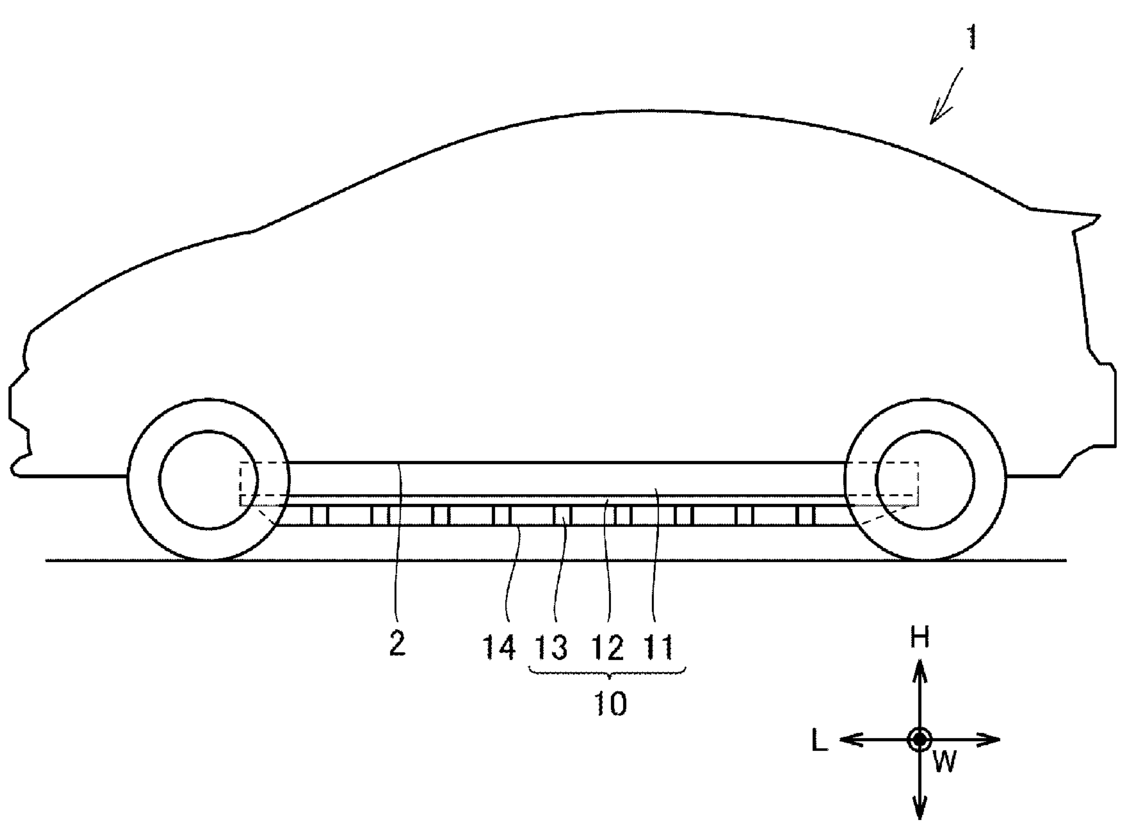
FIG. 1 is a schematic view schematically illustrating a vehicle 1 provided with a battery pack 10.

FIG. 1 is a schematic view schematically illustrating a vehicle 1 provided with a battery pack 10. The vehicle 1 includes a floor panel 2. The floor panel 2 is a metal plate-shaped member forming the bottom face of the vehicle 1.

The battery pack 10 is placed on the lower face of the floor panel 2. The battery pack 10 includes a battery device 11, a cooler 12, and buffer members 13.

The battery device 11 is placed on the lower face side of the floor panel 2. The cooler 12 is placed on the lower face of the battery device 11. A protection plate 14 is placed below the battery device 11 at an interval. The buffer members 13 are placed at intervals between the protection plate 14 and the battery device 11.

Figure 2:
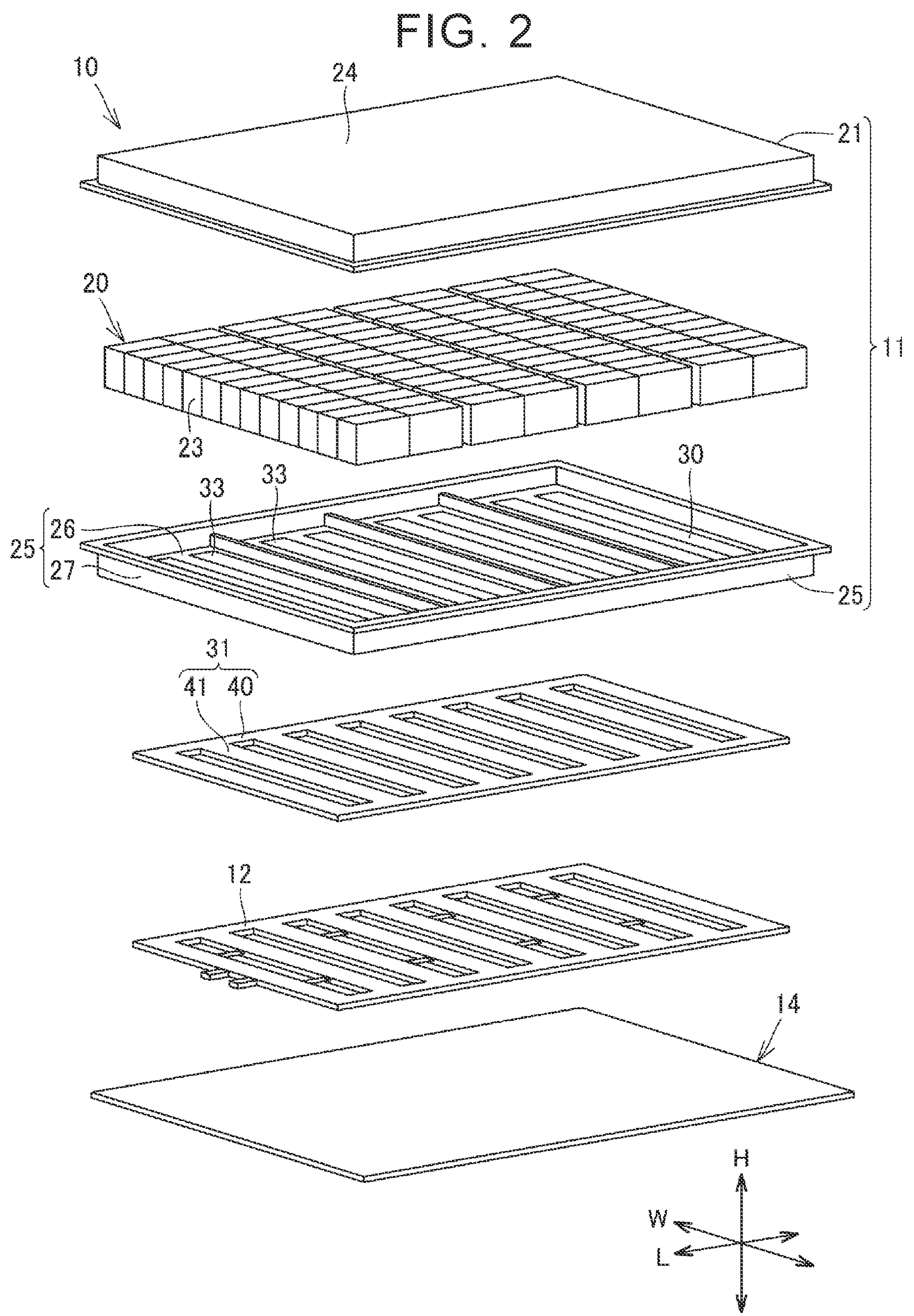
FIG. 2 is an exploded perspective view illustrating the battery pack 10.

FIG. 2 is an exploded perspective view illustrating the battery pack 10.

The battery device 11 includes a plurality of battery stacks 20 and a battery outer case 21 in which the battery stacks 20 are accommodated.

The battery stacks 20 are formed to be elongated in a vehicle width direction W. The battery stack 20 includes a plurality of battery cells 23 arranged in the vehicle width direction W. The battery stacks 20 are placed at intervals in a front-rear direction (arrangement direction) L.

The battery outer case 21 includes an upper case 24 and a lower case 25. The upper case 24 is provided to cover the battery stacks 20 from above. The lower case 25 is provided to cover the battery stacks 20 from below. Note that the upper case 24 and the lower case 25 are made of metal such as aluminum alloy.

The lower case 25 includes a base plate 26 and a peripheral wall 27. The peripheral wall 27 is formed in an outer peripheral edge part of the base plate 26 such that the peripheral wall 27 stands upward from the outer peripheral edge part of the base plate 26.

The battery pack 10 includes an inner heat conductive layer 30 placed on the upper face of the base plate 26, and an outer heat conductive layer 31 placed on the lower face of the base plate 26.

The inner heat conductive layer 30 includes a plurality of heat conductive portions 33, and each of the heat conductive portions 33 is placed between the battery stack 20 and the base plate 26. The heat conductive portions 33 are formed to be elongated in the vehicle width direction W.

The inner heat conductive layer 30 is made of urethane-based resin, for example. Note that the inner heat conductive layer 30 may be made of an adhesive containing silicone-based resin, acrylic resin, epoxy resin, or the like.

The inner heat conductive layer 30 is a member configured to transmit heat of each of the battery stacks 20 to the cooler 12. The inner heat conductive layer 30 also functions as an adhesive by which the battery stacks 20 are fixed to the base plate 26.

The outer heat conductive layer 31 is placed between the base plate 26 and the cooler 12. The outer heat conductive layer 31 includes an outer frame portion 40 formed in an annular shape and a plurality of heat conductive portions 41.

The heat conductive portions 41 are placed below the battery stacks 20. The heat conductive portions 41 are formed to be elongated in the vehicle width direction W. Both ends of each of the heat conductive portions 41 are connected to the outer frame portion 40.

The outer heat conductive layer 31 is made of urethane-based resin, for example. Note that the outer heat conductive layer 31 may be made of an adhesive containing silicone-based resin, acrylic resin, epoxy resin, or the like. The outer heat conductive layer 31 also functions as an adhesive via which the cooler 12 is bonded to the base plate 26.

The outer heat conductive layer 31 transmits, to the cooler 12, heat from the battery stack 20 that is transmitted through the inner heat conductive layer 30 and the base plate 26.

Figure 3:
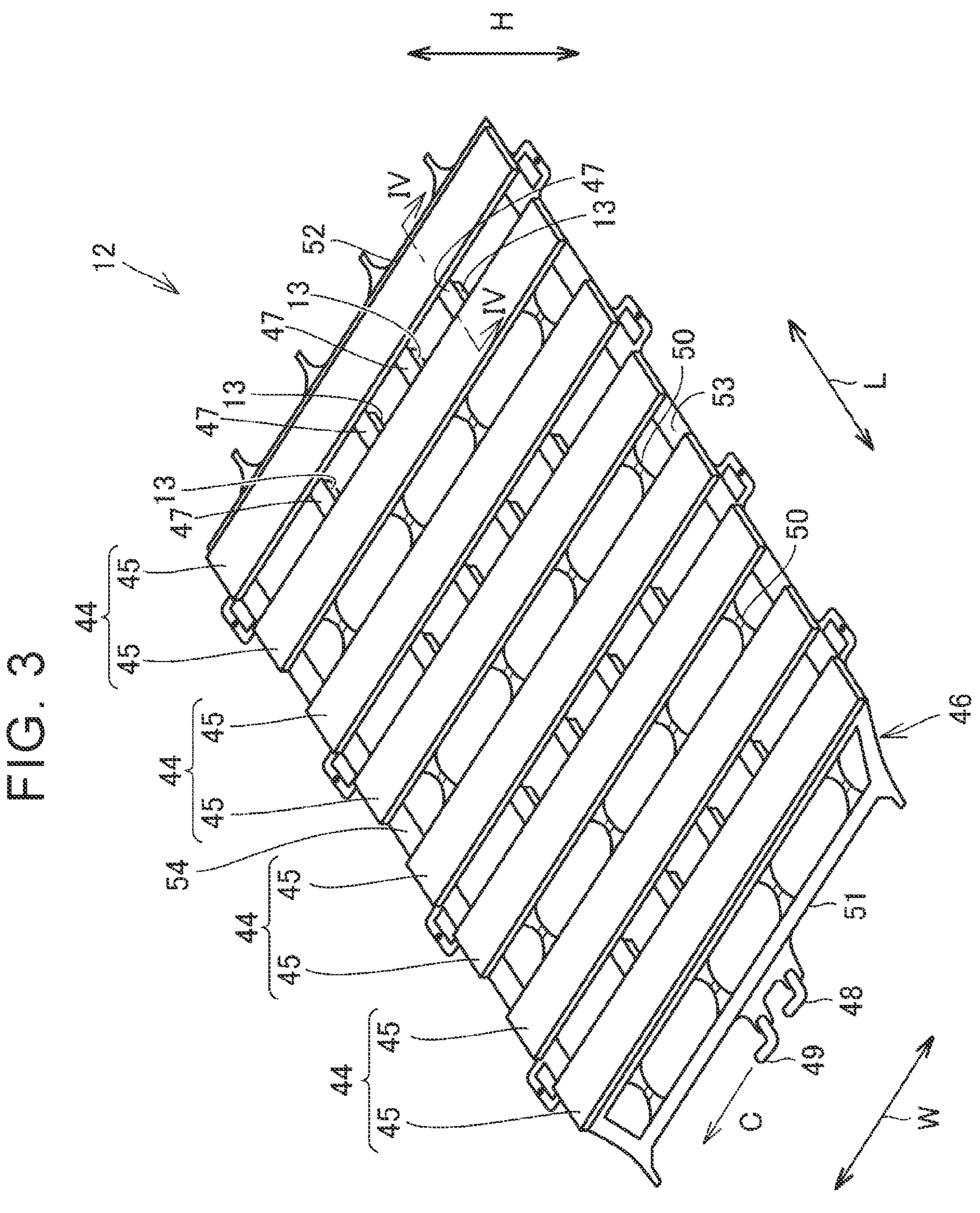
FIG. 3 is a perspective view illustrating a cooler 12.

FIG. 3 is a perspective view illustrating the cooler 12. The cooler 12 includes a cooling unit 44, a hold frame 46, a supply pipe 48, a discharge pipe 49, and a reinforcing portion 50.

The hold frame 46 is formed in an annular shape. The hold frame 46 includes a front beam 51, a rear beam 52, a side beam 53, and a side beam 54.

The front beam 51 is provided in a front end of the hold frame 46 and is formed to extend in the vehicle width direction W. The rear beam 52 is provided in a rear end of the hold frame 46 and is formed to extend in the vehicle width direction W.

The side beam 53 is provided on the left side of the vehicle and is formed to extend in the front-rear direction L. The side beam 54 is provided on the right side of the vehicle and is formed to extend in the front-rear direction L.

The supply pipe 48 and the discharge pipe 49 are provided in the front beam 51. Refrigerant C is supplied from the supply pipe 48. The refrigerant C thus supplied is supplied to each cooling unit 44. The refrigerant C flowing through each cooling unit 44 is discharged to outside from the discharge pipe 49.

A plurality of cooling units 44 is provided. In the example illustrated in FIG. 3, four cooling units 44 are provided. The cooling unit 44 includes a plurality of cooling modules 45 and a plurality of connecting portions 47. In the example illustrated in FIG. 3, the cooling unit 44 includes two cooling modules 45. In each of the cooling modules 45, a refrigerant passage 62 through which the refrigerant C flows is formed.

The cooling unit 44 is formed to extend in the vehicle width direction W. On the left side of the vehicle, a first end of the cooling unit 44 is supported by the side beam 53, and a second end of the cooling unit 44 is supported by the side beam 54.

The cooling modules 45 are placed at intervals in the front-rear direction L. The connecting portions 47 are provided to connect adjacent cooling modules 45 to each other. The connecting portions 47 are formed to extend in the front-rear direction L. The connecting portions 47 are placed at intervals in the vehicle width direction W. The buffer members 13 are placed on the lower faces of the connecting portions 47.

The reinforcing portion 50 is provided to connect adjacent cooling units 44 in the front-rear direction L to each other. Note that the number of the connecting portions 47 arranged in the vehicle width direction W is larger than the number of the reinforcing portions 50 arranged in the vehicle width direction W.

Figure 4:
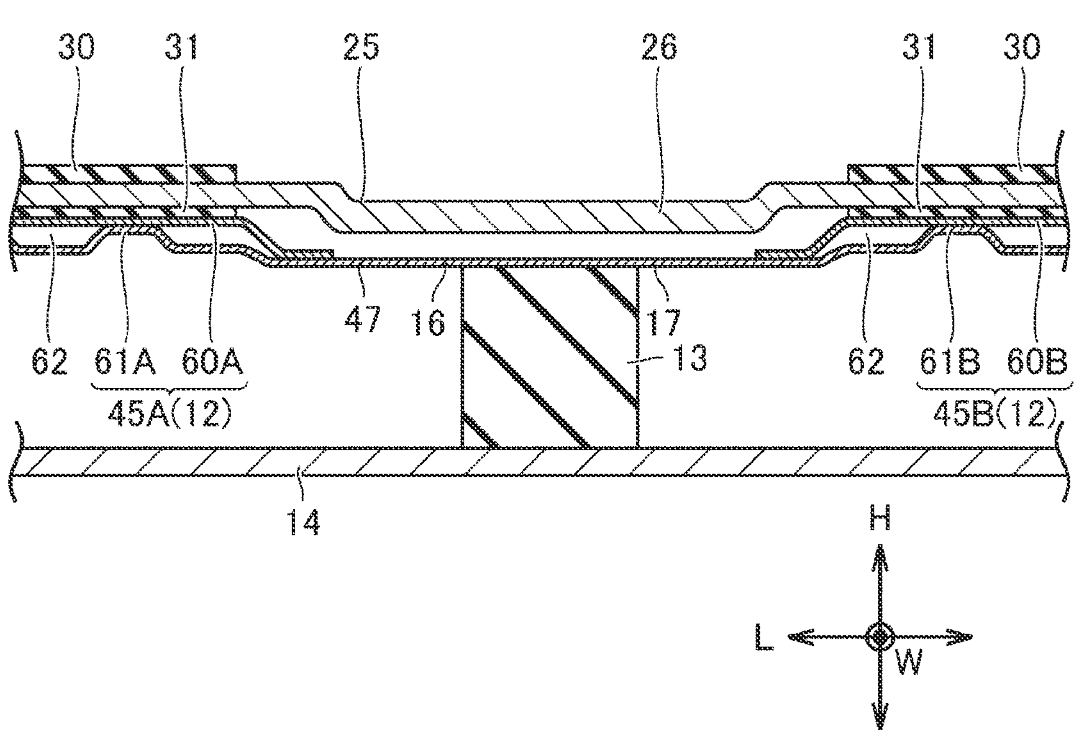
FIG. 4 is a sectional view taken along a line IV-IV in FIG. 3.

FIG. 4 is a sectional view taken along a line IV-IV in FIG. 3.

In FIG. 4, a cooling module 45A, 45B includes a cooling plate 60A, 60B and a cooling plate 61A, 61B. A plurality of grooves extending in the vehicle width direction W is formed in the cooling plate 61A, 61B. The cooling plate 61A, 61B is connected to the cooling plate 60A, 60B by welding or the like, so that a plurality of refrigerant passages 62 is formed between the cooling plate 60A, 60B and the cooling plate 61A, 61B.

The outer heat conductive layer 31 is formed on the upper face of the cooling plate 60A, 60B, and the base plate 26 of the lower case 25 is placed on the upper face of the outer heat conductive layer 31. The inner heat conductive layer 30 is formed on the upper face of the base plate 26. Although not illustrated in FIG. 4, the battery stacks 20 are placed on the upper face of the inner heat conductive layer 30.

The heat of the battery stacks 20 sequentially passes through the inner heat conductive layer 30, the base plate 26, and the outer heat conductive layer 31 and reaches the cooler 12 such that the heat is dissipated by the cooler 12.

The connecting portion 47 is formed to connect the cooling plate 61A to the cooling plate 61B. The connecting portion 47 is formed integrally with the cooling plate 61A and the cooling plate 61B.

The protection plate 14 is placed below the cooler 12. The protection plate 14 is fixed to the lower case 25 by a fixing member (not illustrated). The buffer member 13 is placed between the protection plate 14 and the connecting portion 47.

Figure 5:
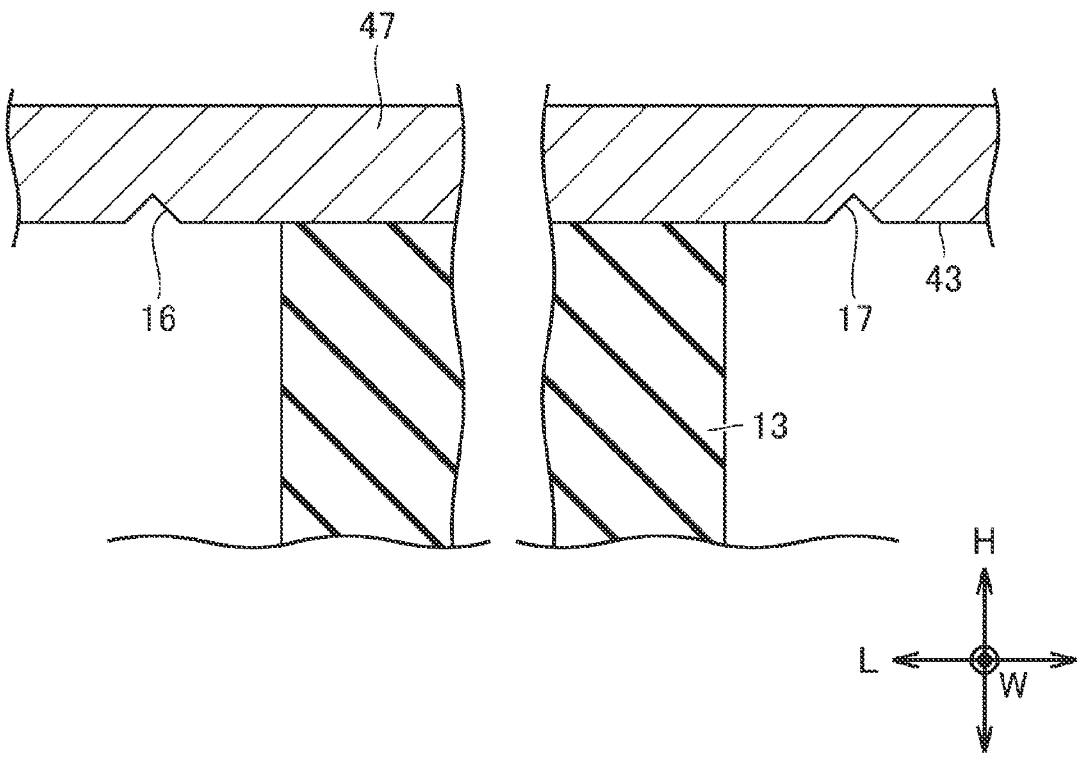
FIG. 5 is a sectional view illustrating a configuration of an upper end portion of a buffer member 13 and its surrounding area.
Figure 6:
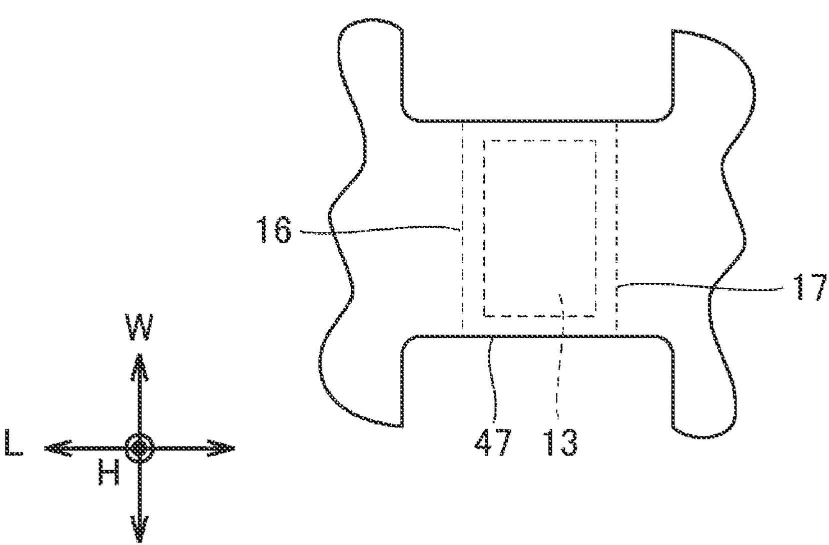
FIG. 6 is a plan view illustrating the buffer member 13, a connecting portion 47, and mark-off lines 16, 17.

FIG. 5 is a sectional view illustrating a configuration of an upper end part of the buffer member 13 and its vicinal area. In FIG. 5, mark-off line 16, 17 are formed on a lower face 43 of the connecting portion 47. FIG. 6 is a plan view illustrating the buffer member 13, the connecting portion 47, and the mark-off lines 16, 17.

In FIGS. 5, 6, the mark-off lines 16, 17 extend in the vehicle width direction W.

The mark-off line 16 and the mark-off line 17 are formed in a part of the connecting portion 47 where the buffer member 13 is placed. Here, the part of the connecting portion 47 where the buffer member 13 is placed is not limited to a part where the upper end part of the buffer member 13 makes contact with the lower face of the connecting portion 47 and includes its surrounding part. Accordingly, in the example illustrated in FIGS. 5, 6, the mark-off lines 16, 17 are formed at positions distanced from the upper end part of the buffer member 13 in the front-rear direction L.

In other words, in a direction where the connecting portion 47 extends, a contact portion between the connecting portion 47 and the buffer member 13 is placed between the mark-off line 16 and the mark-off line 17.

Note that the mark-off line 16 is placed on a side closer to a central part of the connecting portion 47 in the front-rear direction L than a connecting part between the cooling plate 61A and the connecting portion 47. Note that, in the central part of the connecting portion 47 in the front-rear direction L, the contact portion between the buffer member 13 and the connecting portion 47 is placed. Similarly, the mark-off line 17 is placed on a side closer to the central part of the connecting portion 47 in the front-rear direction L than a connecting part between the cooling plate 61B and the connecting portion 47.

Note that an assembling step of assembling the battery pack 10 includes a step of placing the buffer member 13 at a predetermined position on the lower face of the connecting portion 47. In this placing step, the mark-off lines 16, 17 can be used as marks, so that an attachment position of the buffer member 13 can be easily checked, thereby making it possible to easily perform quality verification.

In the battery pack 10 configured as described above, at the time when the vehicle 1 is traveling, foreign matter on a road might be flicked off by a tire or the like and hit the protection plate 14. Further, the vehicle 1 might run onto a falling object or the like on a road or interfere with a road surface. In such a case, an impact force is applied to the protection plate 14 toward the upper side.

Figure 7:
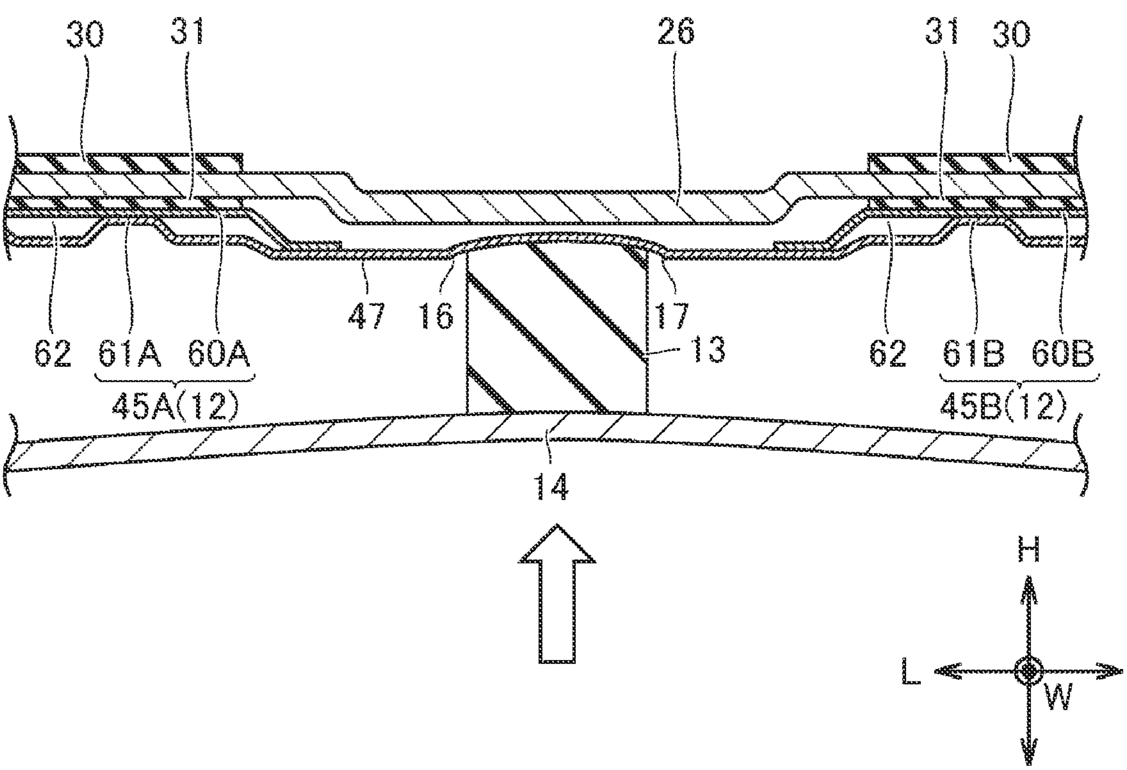
FIG. 7 is a sectional view when an impact force is applied to the protection plate 14.

FIG. 7 is a sectional view when the impact force is applied to the protection plate 14.

The protection plate 14 deforms to swell upward by the impact force. When the protection plate 14 deforms to swell upward, the buffer member 13 deforms to shrink and also presses the connecting portion 47 upward.

Here, the mark-off line 16, 17 are formed on the lower face 43 of the connecting portion 47. Accordingly, when a load is applied to the connecting portion 47 toward the upper side by the buffer member 13, the buffer member 13 curves starting from the mark-off lines 16, 17.

In other words, even when an impact force is applied to the connecting portion 47 at the contact part between the buffer member 13 and the connecting portion 47, it is possible to restrain a load from being transmitted to the connecting part between the cooling plate 61A and the connecting portion 47 and the connecting part between the cooling plate 61B and the connecting portion 47.

Hereby, it is possible to restrain a load from being transmitted to the cooler 12, thereby making it possible to restrain the cooler 12 from being damaged.

For example, when an impact force is applied to the cooler 12, such an adverse effect occurs that the cooling plate 61A, 61B is separated from the cooling plate 60A, 60B and the refrigerant C leaks outside. In the present embodiment, it is possible to restrain the occurrence of such an adverse effect.

As such, in the present embodiment, the mark-off lines 16, 17 function as "vulnerable portions." Meanwhile, various configurations can be employed as the vulnerable portions. For example, the following methods can be employed. That is, parts where the mark-off lines 16, 17 are provided may be formed as thinned parts or may be corroded.

It should be considered that the embodiment described herein is just an example in all respects and is not limitative. The scope of this disclosure is shown by claims and is intended to include all modifications made within the meaning and scope equivalent to claims.

What is claimed is:

1. A battery pack comprising:
- a plurality of battery stacks provided such that the battery stacks are placed at intervals in an arrangement direction;
- a battery outer case in which the battery stacks are accommodated;
- a cooler placed on a bottom face of the battery outer case; and
- a buffer member, wherein:
- the cooler includes a plurality of cooling modules provided such that the cooling modules are placed at intervals in the arrangement direction; and
- a connecting portion configured to connect adjacent cooling modules in the arrangement direction to each other;
- in each of the cooling modules, a refrigerant passage through which refrigerant flows is formed, the connecting portion fluidly separated from the refrigerant passage in each of the cooling modules;
- the buffer member is placed between the connecting portion and a protection plate placed below the cooler;
- a vulnerable portion is formed in a part of the connecting portion, the part being where the buffer member is placed; and
- the vulnerable portion is a mark-off line.

2. The battery pack according to claim 1, wherein the vulnerable portion is placed on a side closer to a contact portion between the connecting portion and the buffer member than a joined portion between the cooling module and the connecting portion.

* * * * *